US012784234B2

(12) United States Patent

Mizushima et al.

(10) Patent No.: US 12,784,234 B2

(45) Date of Patent: Nov. 3, 2026

(54) TRAJECTORY ANALYSIS DEVICE, TRAJECTORY ANALYSIS METHOD, AND COMPUTER PROGRAM

(71) Applicant: Panasonic Intellectual Property Management Co., Ltd., Osaka (JP)

(72) Inventors: Kaito Mizushima, Hyogo (JP); Hidehiko Shin, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 269 days.

(21) Appl. No.: 18/527,637

(22) Filed: Dec. 4, 2023

(65) Prior Publication Data

US 2024/0112355 A1 Apr. 4, 2024

Related U.S. Application Data

(63) Continuation of application No. PCT/JP2022/013164, filed on Mar. 22, 2022.

(30) Foreign Application Priority Data

Jun. 4, 2021 (JP) ................................ 2021-094520

(51) Int. Cl.
*G06T 7/246* (2017.01)

(52) U.S. Cl.
CPC .... *G06T 7/246* (2017.01); *G06T 2207/10016* (2013.01); *G06T 2207/30241* (2013.01)

(58) Field of Classification Search
CPC ........... G06T 7/246; G06T 2207/10016; G06T 2207/30241; G06V 20/58; G08G 1/01
See application file for complete search history.

(56) References Cited

U.S. PATENT DOCUMENTS

2013/0163815 A1 6/2013 Mai
2015/0019161 A1 1/2015 Moriguchi et al.
(Continued)

FOREIGN PATENT DOCUMENTS

JP 2016-66111 4/2016
JP 2020-91664 6/2020
(Continued)

OTHER PUBLICATIONS

International Search Report issued Jun. 21, 2022 in International (PCT) Application No. PCT/JP2022/013164.
(Continued)

*Primary Examiner* — John B Strege
(74) *Attorney, Agent, or Firm* — Wenderoth, Lind & Ponack, L.L.P.

(57) ABSTRACT

A trajectory analysis device extracting a trajectory of movement of a moving object by using results of detection by one or more sensors disposed in an environment where the moving object exists, is provided. The device includes a storage and a controller. The storage stores: partial trajectory data indicative of a plurality of partial trajectories extracted in advance from the results of detection; connection parameter information indicative of a connection condition for connecting the partial trajectories to each other; and partial area data defining each of a plurality of partial areas. The controller connects two partial trajectories each belonging to any of the plurality of partial areas, based on the connection parameter information, to extract a trajectory of the moving object for each of the partial areas. The connection parameter information is set for each of the partial areas.

19 Claims, 16 Drawing Sheets

(56) References Cited

U.S. PATENT DOCUMENTS

| | | | | |
|---|---|---|---|---|
| 2018/0129214 | A1* | 5/2018 | Düring | G06V 20/58 |
| 2019/0331484 | A1 | 10/2019 | Moriguchi et al. | |
| 2020/0338730 | A1* | 10/2020 | Yamauchi | B25J 9/1671 |
| 2022/0005207 | A1* | 1/2022 | Ebiyama | G06T 7/33 |
| 2023/0256600 | A1* | 8/2023 | Hirakawa | G05B 19/4103 700/245 |

FOREIGN PATENT DOCUMENTS

| | | |
|---|---|---|
| WO | 2013/128852 | 9/2013 |
| WO | 2020/085178 | 4/2020 |

OTHER PUBLICATIONS

English translation of International Preliminary Report on Patentability issued Nov. 21, 2023 in International (PCT) Application No. PCT/JP2022/013164.

Extended European Search Report issued Jul. 10, 2024 in corresponding European Patent Application No. 221815647.7.

* cited by examiner

*FIG. 9*

D1

| ID | TIME T | POSITION(x,y) | |
|---|---|---|---|
| 0 | 0 | 10 | 20 |
| 1 | 0 | 50 | 100 |
| 2 | 0 | 35 | 50 |
| 3 | 0 | 40 | 55 |
| 0 | 1 | 9 | 22 |
| 1 | 1 | 51 | 101 |
| 2 | 1 | 33 | 45 |
| ... | ... | ... | ... |
| 0 | 10 | 25 | 40 |
| ... | ... | ... | ... |

TRAJECTORY ANALYSIS DEVICE, TRAJECTORY ANALYSIS METHOD, AND COMPUTER PROGRAM

CROSS REFERENCE TO RELATED APPLICATION(S)

This is a continuation application of International Application No. PCT/JP2022/013164, with an international filing date of Mar. 22, 2022, which claims priority of Japanese Patent Application No. 2021-094520 filed on Jun. 4, 2021, each of the content of which is incorporated herein by reference.

BACKGROUND

1. Technical Field

The present disclosure relates to a trajectory analysis device extracting a trajectory of movement of a moving object from the results of detection of sensors disposed in an environment where the moving object exists, a trajectory analysis method, and a computer program.

2. Related Art

JP2020091664A provides a technique of tracking a person in consecutive image frames captured by a camera. More specifically, JP2020091664A discloses a technique of continuing robust person tracking by supplementing tracking information even if inter-person occlusion occurs when persons overlap with each other in image frames or even if person detection fails. JP2020091664A decides where to connect an interrupted trajectory, based on the inter-frame score. Employed as a connection candidate is a trajectory having an evaluation cost equal to or greater than a previously set threshold value.

SUMMARY

The technique of JP2020091664A needs to set the threshold value of the evaluation cost in advance. In order to set the threshold value that is considered optimal, trial and error is required, which is time consuming.

The present disclosure provides a technique that, in the case where an originally single trajectory breaks off and is recognized as a plurality of partial trajectories, automatically determines connection parameter information indicative of a connection condition for connecting the plurality of partial trajectories into a single line.

A trajectory analysis device according to an aspect of the present disclosure extracts a trajectory of movement of a moving object by using results of detection by one or more sensors disposed in an environment where the moving object exists. The trajectory analysis device includes: a storage that stores partial trajectory data indicative of a plurality of partial trajectories extracted in advance from the results of detection, connection parameter information indicative of a connection condition for connecting the partial trajectories to each other, and partial area data defining each of a plurality of partial areas; and a controller that connects two partial trajectories each belonging to any of the plurality of partial areas, based on the connection parameter information, to extract a trajectory of the moving object for each of the partial areas. The connection parameter information is set for each of the partial areas.

A trajectory analysis method according to an aspect of the present disclosure is a method using a trajectory analysis system, for extracting a trajectory of movement of a moving object from results of detection by one or more sensors disposed in an environment where the moving object exists. A trajectory analysis device of the trajectory analysis system includes a controller and a storage, the storage storing: partial trajectory data indicative of a plurality of partial trajectories extracted in advance from the results of detection; connection parameter information indicative of a connection condition for connecting the partial trajectories to each other; and partial area data defining each of a plurality of partial areas. The controller executes processes of: reading out the partial trajectory data, the connection parameter information, and the partial area data, from the storage; setting the connection parameter information for each of the partial areas; and connecting two partial trajectories belonging to any of the plurality of partial areas, based on the connection parameter information, to extract a trajectory of the moving object for each of the partial areas.

According to the present disclosure, there can be provided a technique that automatically determines connection parameter information indicative of a connection condition for connecting broken trajectories to each other.

BRIEF DESCRIPTION OF DRAWINGS

FIG. 9 is a diagram showing an example of trajectory data that defines a plurality of trajectories including four trajectories generated independently.

DETAILED DESCRIPTION

An embodiment will now be described in detail with proper reference to the drawings. However, more detailed description than necessary may be omitted. For example, detailed description of an already well-known matter and duplicate description for substantially the same configuration may be omitted. This is to avoid unnecessary redundancy in the following description and to facilitate the understanding of those skilled in the art. It should be noted that the inventor(s) provides the accompanying drawings and the following description in order that those skilled in the art fully understand the present disclosure, and does not intend to limit thereby the subject matter described in the claims.

1. Configuration

Figure 1:
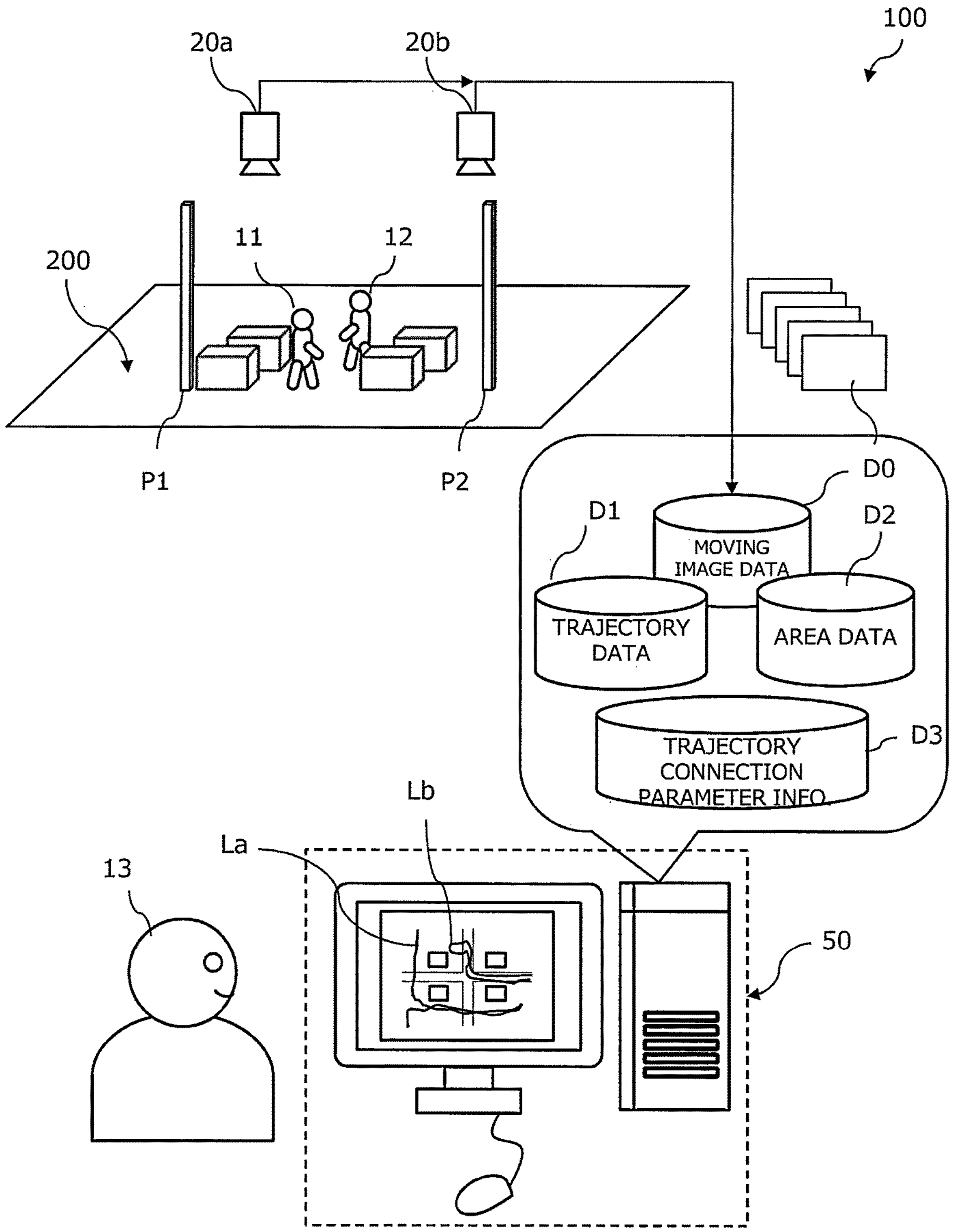
FIG. 1 is a diagram showing an overview of a trajectory analysis system according to an exemplary embodiment of the present disclosure.

A trajectory analysis system according to the present embodiment will be described with reference to FIG. 1. FIG. 1 is a diagram showing an overview of a trajectory analysis system 100 according to the present embodiment. The trajectory analysis system 100 will hereinafter be abbreviated as "the system 100".

1-1. Overview of Trajectory Analysis System

As shown in FIG. 1, the system 100 includes a plurality of cameras 20*a* and 20*b*, and a trajectory analysis device 50. The system 100 enables extracting trajectories that are loci of movements of workers 11 and 12, from a video taken of an environment 200 of a workplace such as a factory or a store where the workers 11 and 12 are present. In this description, persons, objects, etc. that are shot and whose trajectories are to be extracted, such as the workers 11 and 12, are referred to as "moving objects". In this embodiment, processing of extracting a trajectory of a moving object is mainly performed by the trajectory analysis device 50.

The system 100 may accumulate extracted trajectories. The accumulated trajectories of the workers 11 and 12 may be utilized for analysis when, for example, a user 13, such as a manager or an analyst of the environment 200 of the workplace considers the layout of facilities and work efficiency.

In the system 100, the cameras 20*a* and 20*b* are each an example of a sensor detecting the position of a moving object, installed in the environment 200 of the workplace. Other examples of the sensor include a beacon signal receiver when a moving object moves together with a beacon signal transmitter, and a receiver that receives a global positioning system (GPS) signal when the moving object has the receiver. Available as the beacon signal is a signal using Bluetooth (registered trademark) standard-compliant radio waves or a signal using high-frequency electromagnetic waves such as infrared rays. The number of the sensors installed may be one or more than one.

The cameras 20*a* and 20*b* are, for example, box cameras. The cameras 20 and 20*b* are arranged so as to cover the entire range in which the workers 11 and 12 move in the environment 200 of the workplace. The cameras 20*a* and 20*b* each capture a moving image in the workplace 200 to generate moving image data D0. The moving image data DO is, for example, a set of data of frame images each having a framerate of 5 frame/sec (5 fps).

It is not essential that the system 100 have the plurality of cameras 20*a* and 20*b*. For example, there may be disposed a single omnidirectional camera with a fisheye lens, capable of shooting the entire environment 200. The entire range of movements of the workers 11 and 12 need not be completely included in the fields of view of the cameras 20*a* and 20*b*. For example, areas hidden by pillars P1 and P2 in the environment 200 may be blind spots of the cameras 20*a* and 20*b*. However, the entire range of movements of the workers 11 and 12 may include such blind spots. A camera is sometimes called an imaging device.

The trajectory analysis device 50 of the system 100 collects or generates various pieces of data and stores them into a storage device (that will be described later). For example, the trajectory analysis device 50 collects moving image data D0 captured by each of the cameras 20*a* and 20*b*. Besides, the trajectory analysis device 50 stores trajectory data D1, area data D2, and trajectory connection parameter information D3, into the storage device. Details of the data D0 to D3 will be described later.

The trajectory analysis device 50 may present the trajectory data, etc. of each moving object to the user in an analyzable manner. In FIG. 1, two trajectories La and Lb presented are illustrated on a display interface such as a display.

1-2. Configuration of Trajectory Analysis Device

Figure 2:
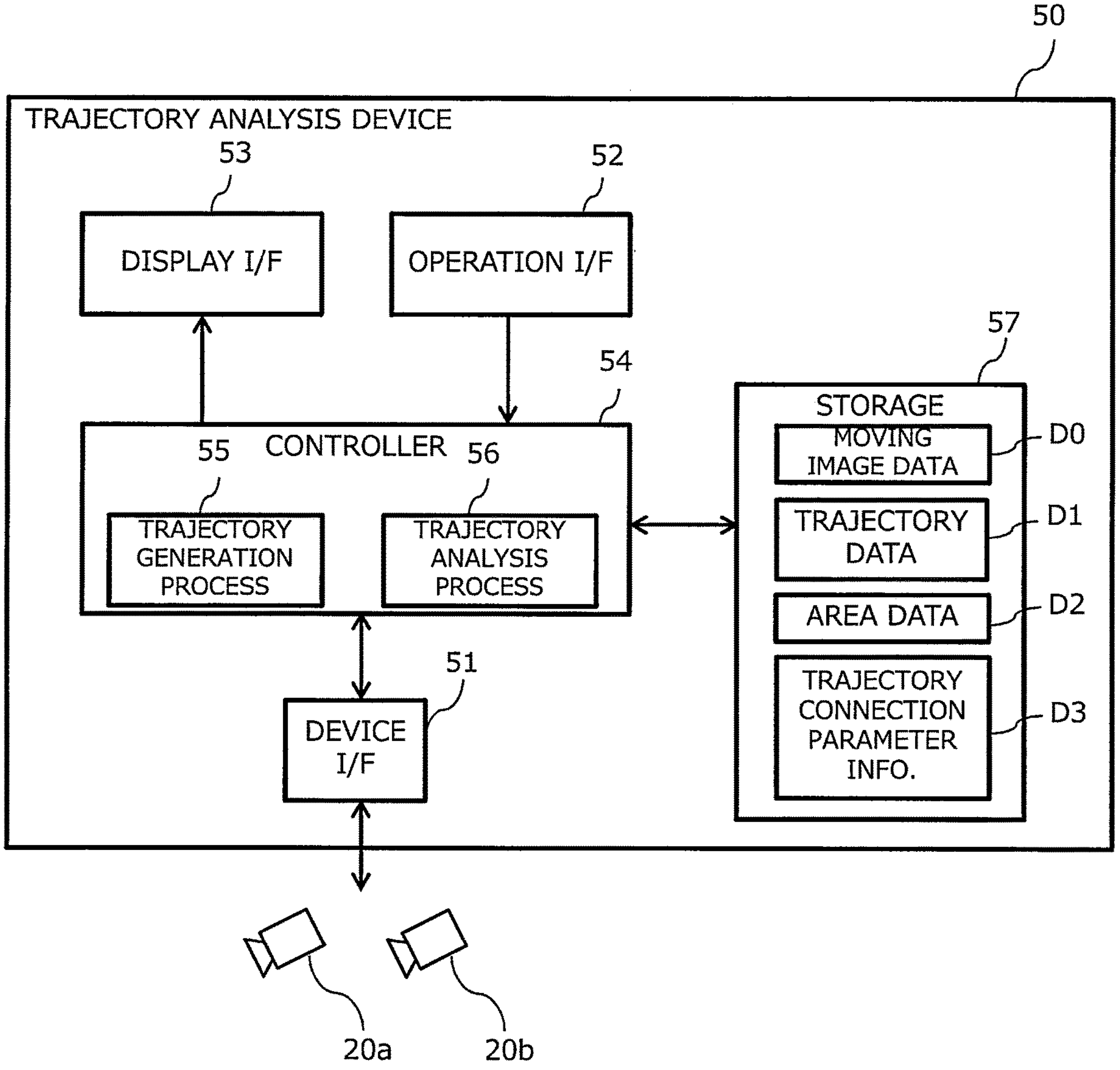
FIG. 2 is a block diagram illustrating a configuration of a trajectory analysis device of the exemplary embodiment of the present disclosure.

A configuration of the trajectory analysis device 50 in the system 100 will hereinafter be described with reference to FIG. 2. FIG. 2 is a block diagram illustrating the configuration of the trajectory analysis device 50 of this embodiment.

The trajectory analysis device 50 is implemented with an information processing device such as, e.g., a PC or a tablet computer. The trajectory analysis device 50 illustrated in FIG. 2 includes a device interface 51 for connection with an external device such as the cameras 20*a* and 20*b*, an operation interface 52 that receives an operation from the user, a display interface 53 for screen display, a controller 54 that controls action of the trajectory analysis device 50, and a storage 57 that stores data and programs.

The device interface 51 is a connection circuit that performs connection and data communication between devices, in accordance with a communication standard such as USB, IEEE 802.11 or Bluetooth (registered trademark). The system 100 transfers moving image data from the cameras 20*a* and 20*b* to the trajectory analysis device 50 via the device I/F 51. The device I/F 51 may constitute an input interface for inputting a user operation from an external device.

The operation interface 52 is implemented with e.g., any of a keyboard, a mouse, a trackpad, a touch panel, and the like, or a combination thereof. The operation interface 52 acquires pieces of information input by the user operation. The operation interface 52 is an example of the input interface of the trajectory analysis device 50 in the present embodiment.

The display interface 53 is implemented with e.g., a liquid crystal display or an organic EL display. The display interface 53 may display various types of information such as various icons for operating the operation interface 52 and information input from the operation interface 52. Various display devices such as a projector and a head-mounted display may be used as the display interface 53. Besides, when an external display device is used, the display interface 53 of the trajectory analysis device 50 may be an output interface circuit for a video signal or the like conforming to a HDMI (registered trademark) standard or the like, for example.

The controller 54 is implemented with e.g., a CPU or an MPU that cooperates with software to achieve predetermined functions. The controller 54 reads out the data and the programs stored in the storage 57, and performs various computing processes to achieve various functions. For example, the controller 54 executes a program containing a command set to execute various processes of the trajectory analysis device 50. The above programs are, for example, application programs, and may be provided from a communication network such as the Internet, or may be stored in a portable storage medium.

In the trajectory analysis device 50 illustrated in FIG. 2, the controller 54 executes e.g., a trajectory generation process 55 and a trajectory analysis process 56 as functional configurations. The trajectory generation process 55 is a process of generating the trajectory data D1 and outputting the trajectory data D1 to the storage 57, by applying an image recognition technique to the moving image data D0. The trajectory analysis process 56 is a process to filter information such as trajectories based on the trajectory data D1, depending on a user operation on the operation interface 52, and to display the filtered information. The detail of the trajectory analysis process 56 will be described later.

The controller 54 may be a hardware circuit such as a dedicated electronic circuit or a reconfigurable electronic circuit designed to perform a predetermined function. The controller 54 may be implemented with a semiconductor integrated circuit such as a CPU, an MPU, a GPU, a GPGPU, a TPU, a microcomputer, a DSP, an FPGA, or an ASIC. Besides, the controller 54 may include an internal memory as a temporary storage area for holding various data and programs.

The storage 57 is a recording medium that stores data and programs, and is implemented with e.g., a hard disk drive (HDD), an optical disk drive, or a semiconductor storage device (SSD). The storage 57 stores various types of data such as e.g., the moving image data D0, the trajectory data D1, the area data D2, and the trajectory connection parameter information D3. The storage 57 may include a temporary storage element implemented with a RAM such as e.g., a DRAM or an SRAM, and may function as a work area of the controller 54. The trajectory analysis device 50 need not necessarily have the operation interface 52 and the display interface 53 as long as it can implement processing that will be described below.

Here, the moving image data D0 and the trajectory data D1 will be described while describing the trajectory generation process 55. As described above, the moving image data D0 is a dataset of frame images each having a predetermined framerate.

Figure 3A:
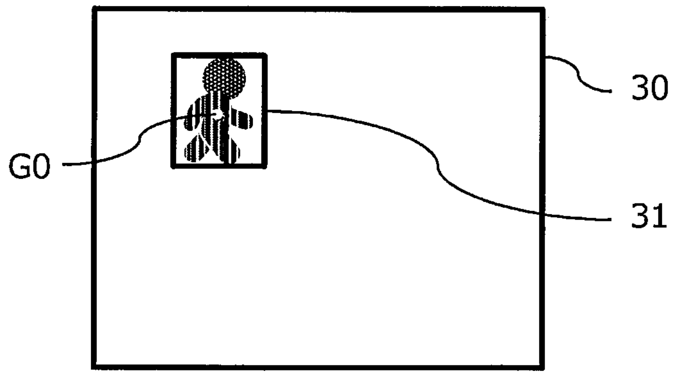
FIG. 3A is a diagram showing a frame image including a worker's image.
Figure 3B:
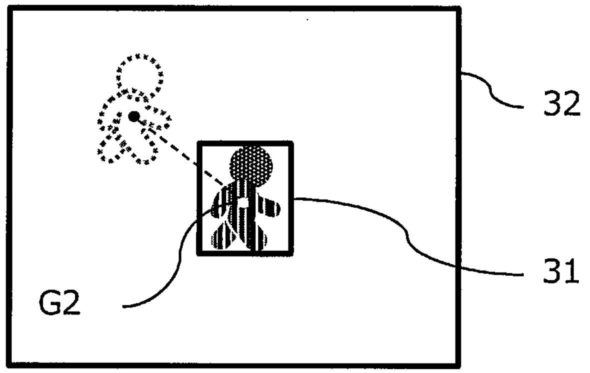
FIG. 3B is a diagram showing a frame image including the worker's image.
Figure 3C:
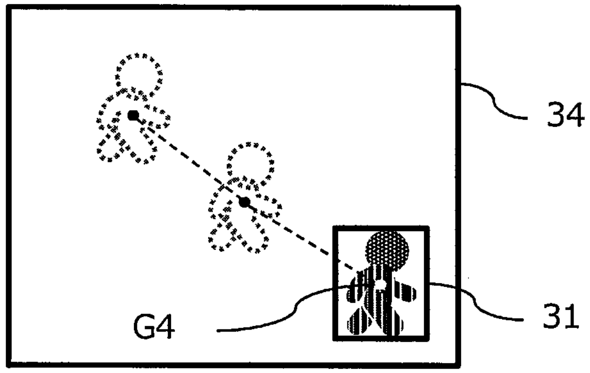
FIG. 3C is a diagram showing a frame image including the worker's image.

FIGS. 3A to 3C show how a worker's image 31 moves in the frame images 30, 32, and 34. The controller 54 can recognize the worker's image 31 in each frame image, by utilizing a learned model that has undergone machine learning of a shape of a moving object, a person in this example, within the image using a publicly known machine learning algorithm. Such machine learning may be performed using, for example, various person's images and frames surrounding the person's images as training data.

Figure 3D:
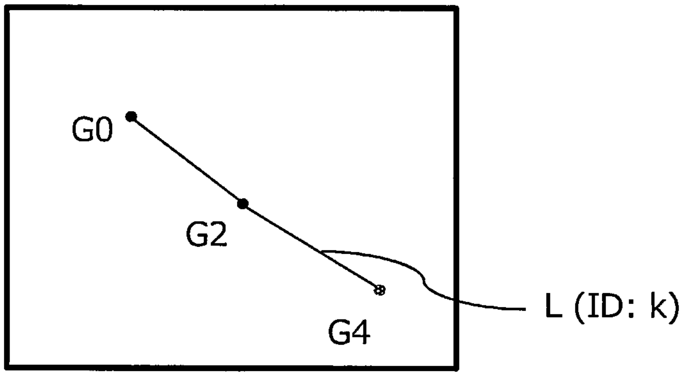
FIG. 3D is a diagram showing an example of a trajectory generated by connecting a sequence of centers of gravity.

For example, the controller 54 calculates, as a representative point, the position of a center of gravity G0 of the image 31 of a person existing in the frame image 30 shown in FIG. 3A. Similarly, for the frame image 32 of FIG. 3B and the frame image 34 of FIG. 3C, the controller 54 calculates the positions of centers of gravity G2 and G4, respectively, of the image 31 of the same person as the person shown in FIG. 3A. FIG. 3D shows an example of a trajectory L generated by connecting the centers of gravity G0, G2, and G4 sequentially. The trajectory generation process 55 is a process of generating the trajectory L in the above procedure. Although in the example of FIGS. 3A to 3C, mention has been made of only the positions of the centers of gravity, information on acquisition times of the frame images is also acquired together with the positions of the centers of gravity. That is, the trajectory L represents not only the change in position of the center of gravity but also the change over time. The controller 54 imparts, to a generated trajectory, an identifier that uniquely identifies the trajectory. The example of FIG. 3D shows that the controller 54 imparts ID=k thereto.

Figure 4:
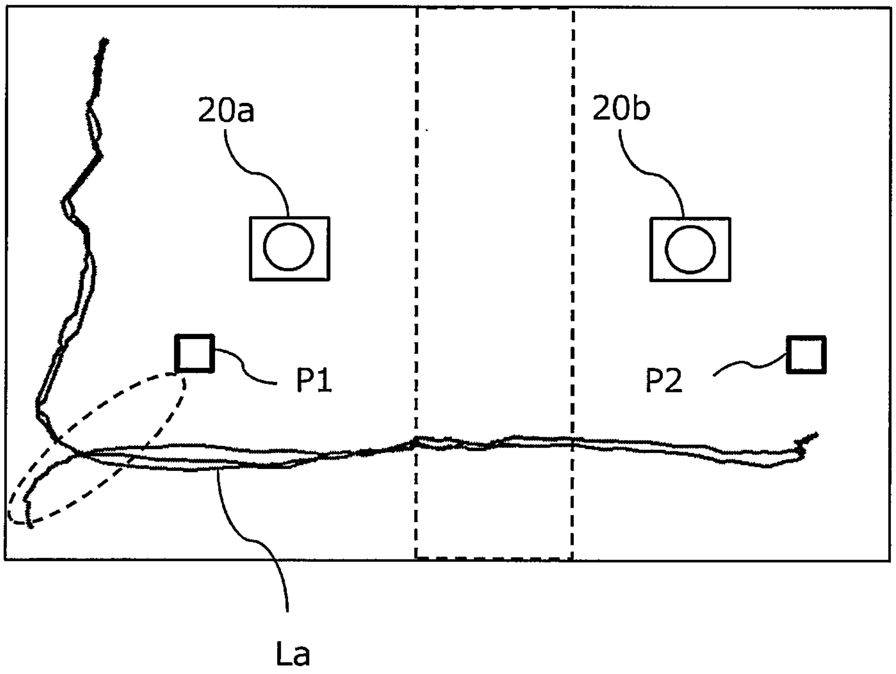
FIG. 4 is a diagram showing an example of a trajectory generated by focusing on a person.

In case that a plurality of persons are present in a frame image, the trajectory is calculated on a person-by-person basis. Hence, the trajectory data D1 is a set of data of the trajectory L acquired from images of the same person that has moved across a plurality of frame images. FIG. 4 shows an example of a trajectory La generated by focusing on a person. It is to be noted that a trajectory La of FIG. 4 shows a trajectory of the worker 11 moving in the environment 200 shown in FIG. 1. For reference, in FIG. 4, the positions of the cameras 20*a* and 20*b* and the positions of the pillars P1 and P2 are shown.

1-3. Reasons why Trajectory Breaks Off

In the example shown in FIG. 4, the trajectory La is depicted with a single line. Ideally, the controller 54 of the trajectory analysis device 50 generates a single continuous and correct trajectory. However, actually, the trajectory to be originally a single line may be generated as two or more partial trajectories. Hereinafter, referring to FIGS. 5 to 8D, two examples will be described where the trajectory is detected in a broken manner due to the existence of blind spots that do not fall in the field of view of the camera.

First of all, a first example will be described where the trajectory is detected brokenly due to the blind spots.

Figure 5:
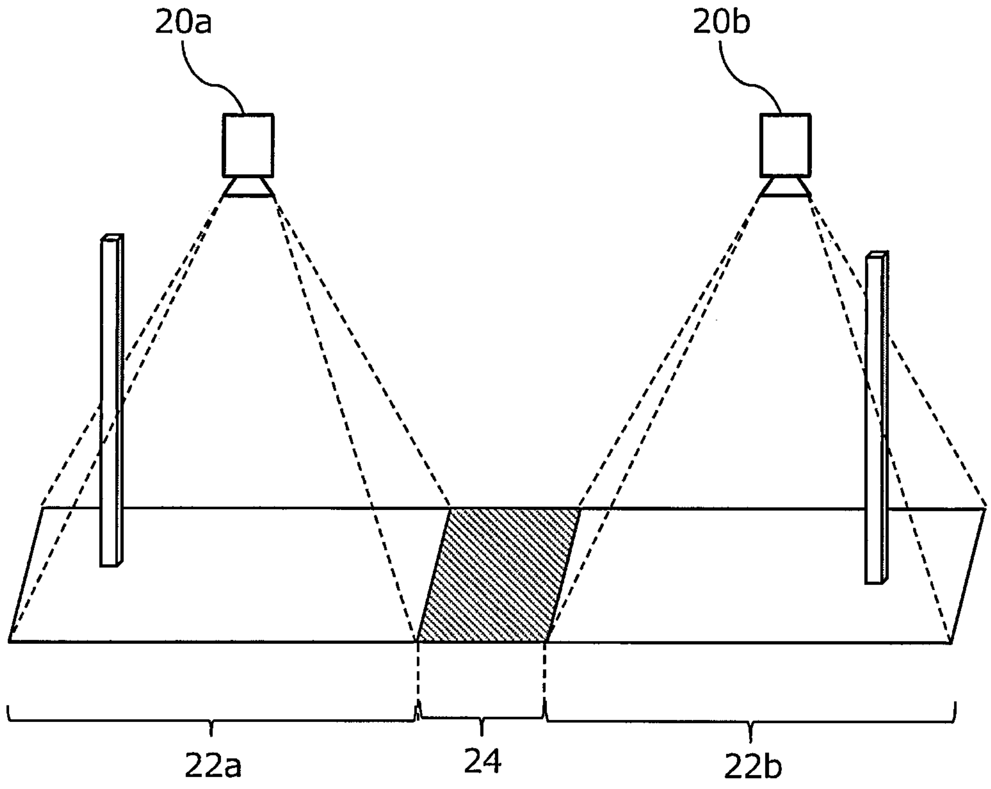
FIG. 5 is a diagram showing a relationship between fields of view of two cameras.

FIG. 5 shows a relationship between a field of view 22*a* of the camera 20*a* and a field of view 22*b* of the camera 20*b*. The fields of view 22*a* and 22*b* correspond to the ranges of images acquired as frame images by the cameras 20*a* and 20*b*. As shown, the environment 200 has a blind spot area 24 that is a blind spot not included in either the field of view 22*a* or 22*b*. Such a blind spot area 24 may occur when setting the shooting ranges of the plurality of cameras. Although for convenience of understanding, FIG. 5 illustrates the blind spot area 24 as an extremely definite rectangular area, the shape and the size may actually be changed appropriately.

In case that a moving object exists in the blind spot area 24, the moving object is not captured by either the camera 20*a* or 20*b*. For this reason, when the moving object moves and enters the blind spot area 24 from the field of view 22*a* or 22*b*, the trajectory detected so far is regarded as terminated at that point of time and breaks off. Then, when the moving object continues moving and enters the field of view 22*b* or 22*a* from the blind spot area 24, the trajectory is detected at that point of time.

Figure 6:
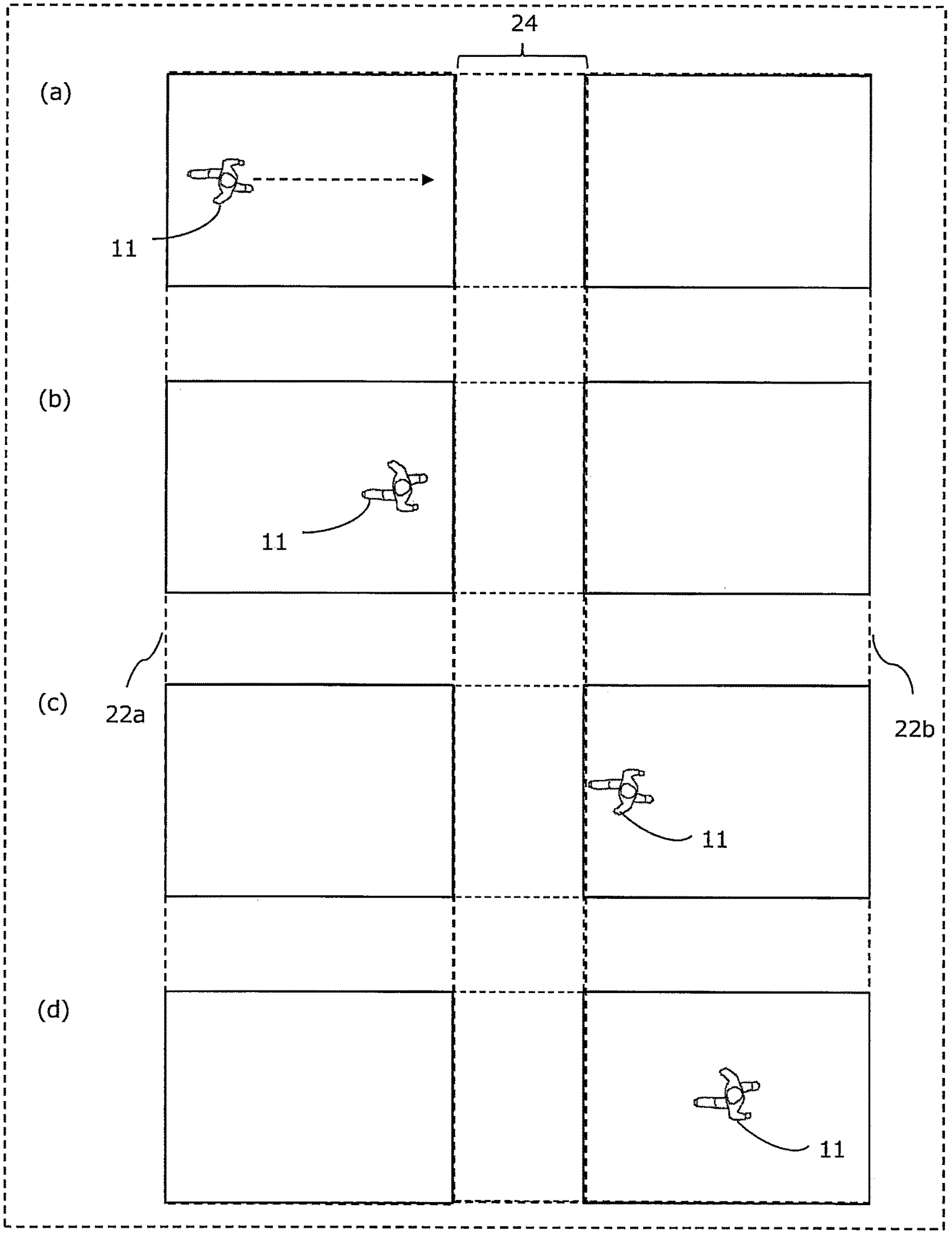
FIG. 6 is a diagram showing a chronological change in position of a worker moving across the fields of view of the two cameras.

(a) to (d) of FIG. 6 show, in turn, a chronological change in position of the worker 11 moving across the fields of view 22*a* and 22*b*. As shown in (a) and (b) of FIG. 6, the worker 11 moves across the field of view 22*a* from the left side of the drawing to the right side. Until reaching the blind spot area 24, the worker 11 is captured by only the camera 20*a*.

Subsequently, the worker 11 enters the blind spot area 24 from the field of view 22*a* and continues moving. At this time, the worker 11 disappears from the field of view 22*a*. Then, as shown in (c) of FIG. 6, when the worker 11 leaves the blind spot area 24 and enters the field of view 22*b* of the camera 20*b*, the worker 11 is captured by the camera 20*b*. Subsequently, as shown in (d) of FIG. 6, along with the movement of the worker 11, the worker 11 is captured by the camera 20*b*.

When the cameras 20*a* and 20*b* obtain their respective moving image data D0, the controller 54 utilizes frame images captured by each of the cameras 20*a* and 20*b*, to recognize images of the worker 11 and generate trajectories independently.

Figure 7:
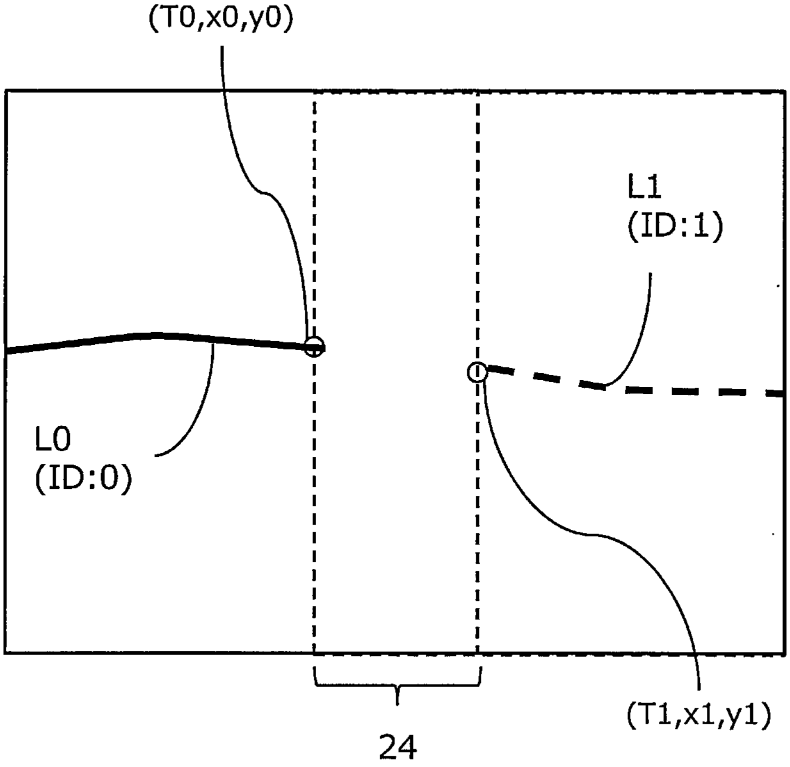
FIG. 7 is a diagram showing trajectories generated from moving image data of the two cameras.

FIG. 7 shows a trajectory L0 (ID: 0) generated from the moving image data of the camera 20*a* and a trajectory L1 (ID: 1) generated from the moving image data of the camera 20*a*. Since the trajectories L0 and L1 represent trajectories of the same worker 11, the controller 54 should impart the same ID to treat them as the same trajectory. However, the controller 54 imparts the different IDs to the trajectories L0 and L1. The reason is that the trajectories L0 and L1 are generated from the moving image data captured by the different cameras 20*a* and 20*b*. Note that the trajectory L0 ends at time T0 and coordinates (x0, y0) when the worker 11 enters the blind spot area 24 from the field of view 22*a* of the camera 20*a*. The trajectory L1 starts at time T1 and coordinates (x1, y1) when the worker 11 enters the field of view 22*b* of the camera 20*b* from the blind spot area 24. In this manner, in case that there exists a blind spot area not included in the fields of view of the plurality of cameras, even if the trajectories are ones of the same worker, they are treated as different trajectories. It is to be noted that in FIG. 7, the time T0 and the coordinates (x0, y0) are put together as (T0, x0, y0). In this description, the same applies hereinafter.

Next, a second example will be described where the trajectory is detected in a broken manner due to the blind spots. The second example is an example where the trajectory breaks off since, due to existence of an obstruction in part of the fields of view of the cameras, the time and the position for the worker to enter behind the obstruction are physically apart from the time and the position for the worker to appear from behind the obstruction.

Figure 8A:
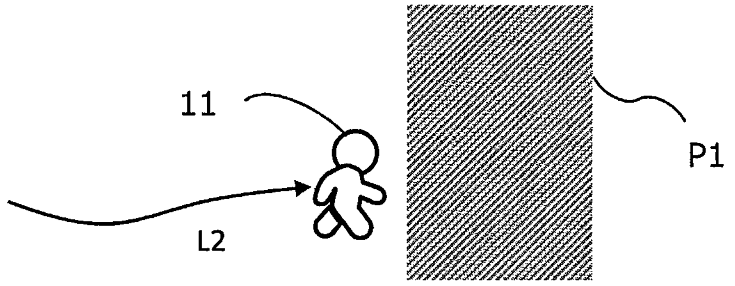
FIG. 8A is a diagram showing a position of the worker before entering a blind spot of the cameras.
Figure 8B:
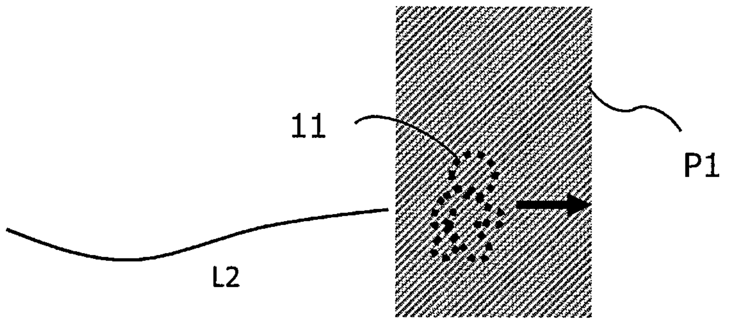
FIG. 8B is a diagram showing a position of the worker during lying in the blind spot of the cameras.
Figure 8C:
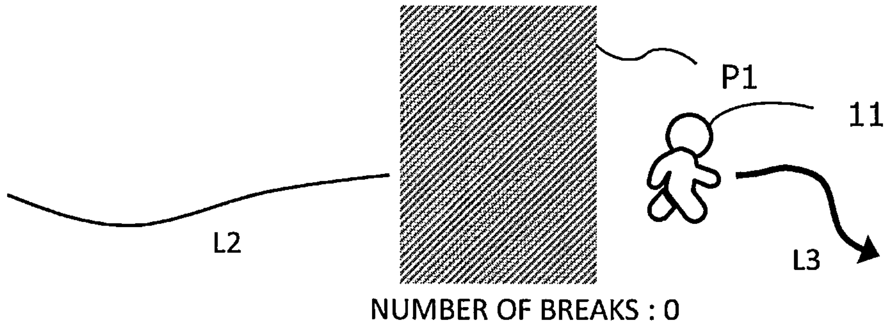
FIG. 8C is a diagram showing a position of the worker after leaving the blind spot of the cameras.

FIGS. 8A to 8C show the change in position of the worker 11 before entering a blind spot of the cameras, during lying in the blind spot, and after leaving the blind spot, respectively. The blind spot corresponds to a position where the field of view 22*a* of the camera 20*a* is obstructed by the pillar P1 for example.

As shown in FIG. 8A, until immediately before the worker 11 enters the blind spot, the controller 54 can generate the change in position of the worker 11 as a continuous trajectory L2. However, as shown in FIG. 8B, when the worker 11 disappears from the frame image, the controller 54 terminates the generation of the trajectory L2 at that point of time and imparts "ID:2" to the trajectory L2.

When the worker 11 continues to move in the blind spot where the field of view is obstructed by the pillar P1, the worker 11 again appears in the field of view of the camera, as shown in FIG. 8C. That is, an image of the worker 11 appears on the frame image. At this point of time, the controller 54 recognizes the image of the worker 11 on the frame image as a new image of the moving object and starts to generate a different trajectory L3. At a point of time when the trajectory is complete, the controller 54 imparts "ID:3" thereto.

Figure 8D:
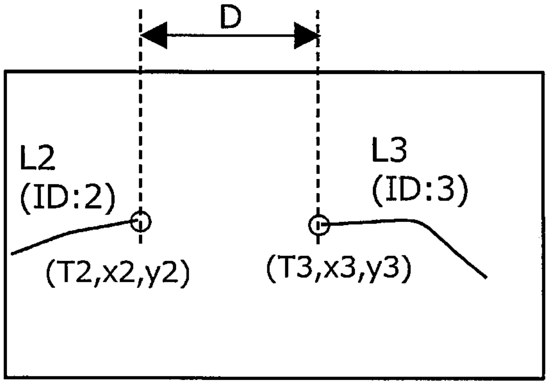
FIG. 8D is a diagram showing an example in which the trajectory of the same worker is generated as different trajectories.

FIG. 8D shows an example in which the trajectory of the same worker 11 is generated as the different trajectories L2 and L3. An ending point (x2, y2) of the trajectory L2 at time T2 and a starting point (x3, y3) of the trajectory L3 at time T3 are spaced apart from each other by a distance D corresponding to the blind spot. In this manner, when the moving object enters the blind spot of the cameras, the trajectory before entering the blind spot and the trajectory after leaving the blind spot are handled as different trajectories, even though they are the trajectory of the same worker.

The above two example where the trajectory is detected in a broken manner can occur independently. Thus, in case that a moving object enters blind spots of a plurality of cameras and moves across the fields of view of the cameras, a plurality of trajectories may be generated separately and independently.

FIG. 9 shows the exemplary trajectory data D1 that defines a plurality of trajectories, including four trajectories with IDs 0 to 3, generated independently. A plurality of entries with the same ID mean points making up a trajectory with that ID. First and last points with that ID are starting and ending points, respectively, of the trajectory with that ID. One or more points with the same ID lying between the starting and ending points are via points therebetween, and the trajectory with that ID is formed by joining the starting point, the one or more via points, and the ending point. Explaining the trajectory with ID 0 for example, time of acquisition of the starting point is 0 and position thereof is (10, 20), while time of acquisition of the ending point is 10 and position thereof is (25, 40). In FIG. 9, position (9, 22) acquired at time 1 is shown as an example of the one or more via points. The entry of the trajectory data D1 is added one after another with the lapse of time, and no entries with the same ID occur after the last point of each ID.

In this description, the thus generated trajectory data is referred to as "partial trajectory data". The partial trajectory data means trajectory data that can make up a single trajectory. The single trajectory is formed by connecting such partial trajectories together. The trajectory connection process is equivalent to the "trajectory analysis process 56" shown in FIG. 2.

The trajectory analysis process 56 is a process of analyzing partial trajectories, to automatically set the connection parameter information indicative of a connection condition for connecting the partial trajectories together. Examples of the connection parameter information include acceptable time (connection time) from when a partial trajectory comes to an end until it connects to the next partial trajectory, and acceptable distance (connection distance) from when a partial trajectory comes to an end until it connects to the next partial trajectory. In other words, the connection parameter information is time (connection time) from the ending time of a partial trajectory till the starting time of the next partial trajectory, and acceptable distance (connection distance) from the ending position of a partial trajectory to the starting position of the next partial trajectory.

Figure 10:
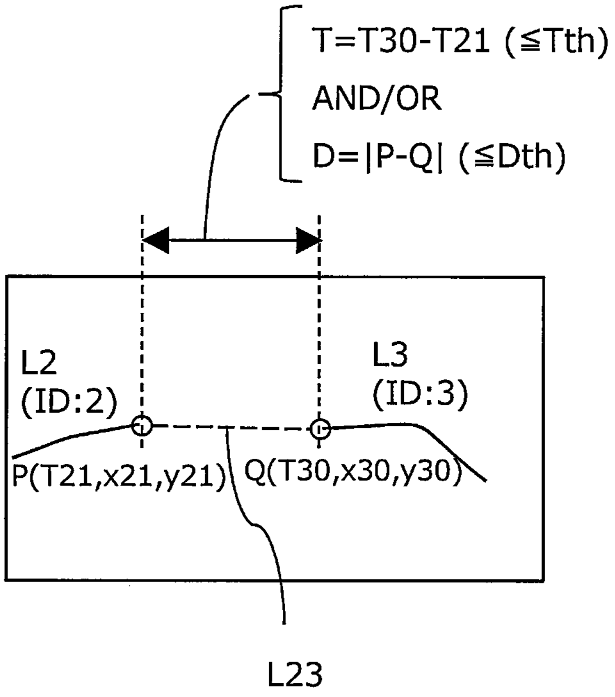
FIG. 10 is a diagram showing an example where two partial trajectories are connected via an interpolation trajectory.

For example, FIG. 10 shows an example where the partial trajectories L2 and L3 are connected via an interpolation trajectory L23. Let "Tth", "Dth", P, and Q be a threshold value of the connection time, a threshold value of the connection distance, a position (x21, y21), and a position (x30, y30), respectively. T21 and T30 are the ending time of the partial trajectory L2 and the starting time of the partial trajectory L3, respectively, and time T30 is later in time and larger in numerical value of representation than T21. At this time, if $T30-T21 \leq Tth$ and/or $|Q-P| \leq Dth$, the partial trajectories L2 and L3 are connected to each other. The threshold values Tth and Dth defining the connection conditions at this time are the connection parameter information. The threshold values of the connection distance and the connection time represent threshold values and acceptable ranges in magnitude of the physical distance between two partial trajectories and of the time distance between acquisition times of the two partial trajectories, and may be determined based on data of a plurality of partial trajectories, collected in the past in each partial area. "The physical distance between two partial trajectories" referred to herein can apply to both of the two partial trajectories detected in the first example described above and the two partial trajectories detected in the second example. That is, "the physical distance between two partial trajectories" may be defined for both of the case where since there is a blind spot area that does not appear in any of a plurality of cameras, originally one trajectory is detected as two partial trajectories and the case where since the worker hides behind an obstruction present within the field of view, originally one trajectory is detected as two partial trajectories.

The velocity of movement or the direction of movement of a moving object may be used as the connection parameter information. For example, in case that there are relatively many installed objects that obstruct movement, the velocity of movement is naturally limited. More specifically, it is physically or empirically impossible that a partial trajectory of a worker moving on foot connects to another partial trajectory 2 meters ahead after 0.1 seconds. In order to eliminate such an impossible movement, it is useful to use the velocity of movement as the connection parameter information. In case that the direction of movement can only be considered in a rectilinear direction from the relationship with the installed objects, directions of movement drawing an arc may be excluded. In this manner, the connection parameter information may be prepared for each of partial areas that are part of the environment 200.

The inventors further set such connection parameter information for each of the partial areas constituting the environment 200, instead of setting it evenly over the environment 200. The reasons are that in the environment 200 there may be various ranges of blind spots and that there may be common areas 24 where the fields of view of a plurality of cameras overlap, different in position and size. Setting the connection parameter information for each of positions where breaks occur, i.e., for each of partial areas is considered to be able to improve the accuracy of connecting a plurality of partial trajectories as a single trajectory. For example, in a factory, etc., there are many cases where the work content differs depending on the work place. By setting the connection parameter information for each of work places where the tendency of movement of a moving object or the tendency of breaks differs, as separate partial areas, it is possible to improve the accuracy of connecting a plurality of partial trajectories together.

In case that two partial trajectories satisfy the connection conditions specified by the connection parameter information, the two partial trajectories are determined as a pair of partial trajectories to be connected to each other. Although it is actually required to correctly connect partial trajectories of the same moving object, in this description, two partial trajectories are regarded as having been correctly connected to each other if satisfying the connection parameter information.

2. Actions

Actions of this system 100 and the trajectory analysis device 50 configured as above will be described below.

2-1. Overview of Actions

Figure 11:
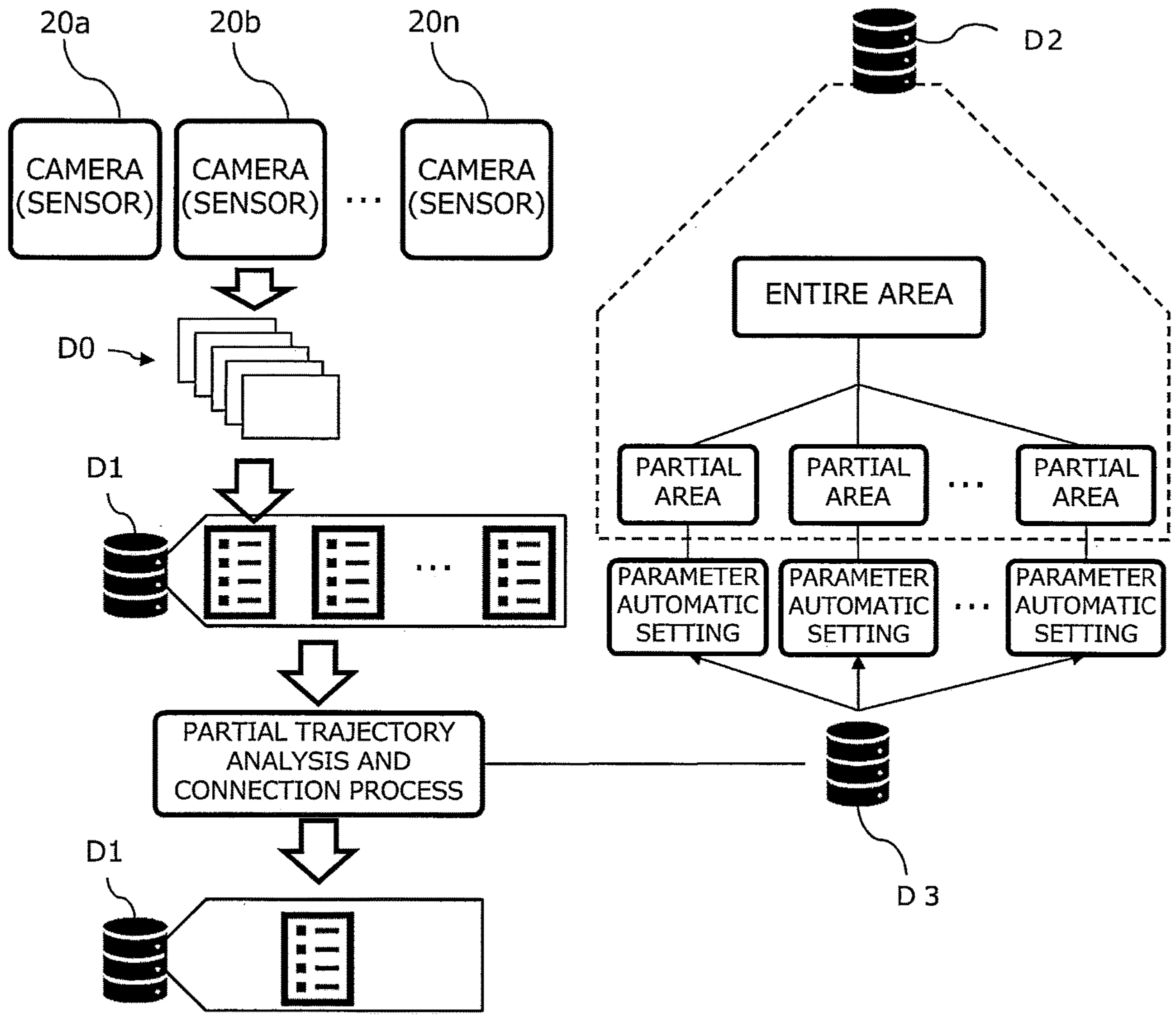
FIG. 11 is a diagram showing a flow of a partial trajectory connection process performed by the trajectory analysis device.

FIG. 11 is a diagram showing a flow of a partial trajectory connection process performed by the trajectory analysis device 50.

First, each of a plurality of cameras 20*a* to 20*n* each having a sensor typified by an image sensor generates moving image data D0. As described above, the "sensor" means a device capable of sensing the position of a moving object. The controller 54 of the trajectory analysis device 50 extracts a trajectory from moving image data generated by each camera. At this time, a partial trajectory is generated due to the above reasons. In this embodiment, the trajectory extracted from the moving image data D0 is assumed to be a partial trajectory. That is, the controller 54 generates a partial trajectory data D1 and stores it into the storage 57.

The controller 54 performs a partial trajectory analysis and connection process. At this time, the trajectory connection parameter information D3 is utilized. The trajectory connection parameter information D3 is set for each of a plurality of partial areas obtained by dividing the entire area of the environment 200, previously prepared in the aria data D2. Setting is carried out based on partial trajectory data collected in the past in each partial area. The controller 54 connects partial trajectories together in accordance with the trajectory connection parameter information D3, to update the trajectory data D1.

2-2. Detail of Actions

Actions of the trajectory analysis device 50 will hereinafter be described in detail. A trajectory connection parameter information setting technique applied to an area will first be described.

Figure 12:
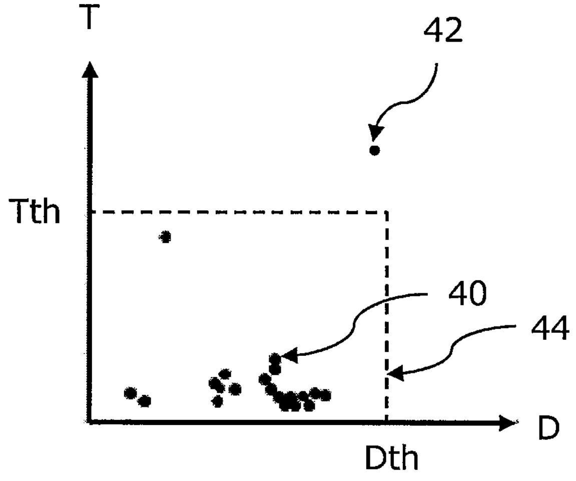
FIG. 12 is a diagram showing a relationship between the connection distance and the connection time between two partial trajectories in the case where the two partial trajectories are connected to each other while changing connection conditions of the two partial trajectories.

2-2-1. First Setting Technique of Trajectory Connection Parameter Information FIG. 12 shows a relationship between the connection distance and the connection time between two partial trajectories in the case where the two partial trajectories are connected to each other while changing the connection conditions of the two partial trajectories. The axis of abscissas represents the connection distance D and the axis of ordinates represents the connection time T. Referring again to FIG. 10, description will be made. The two partial trajectories L2 and L3 are apart from each other by the distance D and the time T. Unless the connection condition related to distance or time, i.e., T30−T21≤Tth and/or |Q−P|≤Dth is satisfied, the two partial trajectories L2 and L3 are not connected to each other. However, as the threshold values Dth and Tth are increased, the threshold values Dth and Tth eventually become equal to or more than the distance D and the time T, respectively. As a result, the two partial trajectories L2 and L3 are permitted to be connected together. The pair of the distance D and the time T at the time of connection of the two partial trajectories L2 and L3 can be depicted as a point, e.g., point 40 on a D-T graph of FIG. 12.

By gradually increasing the threshold value Dth or Tth that is the connection condition as described above, the number of the combination of the partial trajectories connected together increases. Hence, the number of points on the D-T graph also increases. Finally, when the threshold value Dth or Tth becomes extremely large, connections of all the partial trajectories are achieved. However, among such connections of the partial trajectories there are apparently incorrect combinations.

Focus on point 42 of a myriad of points depicted in FIG. 12. Point 42 represents a relationship between two partial trajectories whose connection was eventually established under very relaxed connection conditions. Specifically, it shows that the distance in acquisition time between two partial trajectories is considerably large.

There is a high possibility that such connection of the two partial trajectories is incorrect connection. Thus, the inventors thought that it would be appropriate to set the connection conditions so as to enclose a group of points (hereinafter, described as "correct point group") where two partial trajectories are considered to be correctly connected. Specifically, the inventors set the connection conditions by using a range 44 that encloses the correct point group. Assuming that the range 44 is rectangular, as the connection conditions, the threshold value of the connection distance was set to Dth that is a maximum value in the D-axis direction, and the threshold value of the connection time was set to Tth that is a maximum value in the T-axis direction. For example, in the environment 200, the threshold value Dth is 1.5 meters and the threshold value Tth is 2 seconds. By setting the connection conditions in this manner, the controller 54 of the trajectory analysis device 50 can determine two partial trajectories falling within the range of the connection conditions as a pair of partial trajectories connected to each other.

It is to be noted that the distance between partial trajectories is not limited to the distance defined in the environment 200, i.e., the distance measured in real space. For example, the distance between partial trajectories may be defined by the number of pixels existing between the partial trajectories on a video. Since this description includes both the distance defined in the environment 200 and the distance defined on the video, it may be expressed in some cases as "physical distance between two partial trajectories". Besides, in some cases, the time difference in acquisition between partial trajectories may be expressed as "time distance related to the time of acquisition of each of two partial trajectories".

Figure 13:
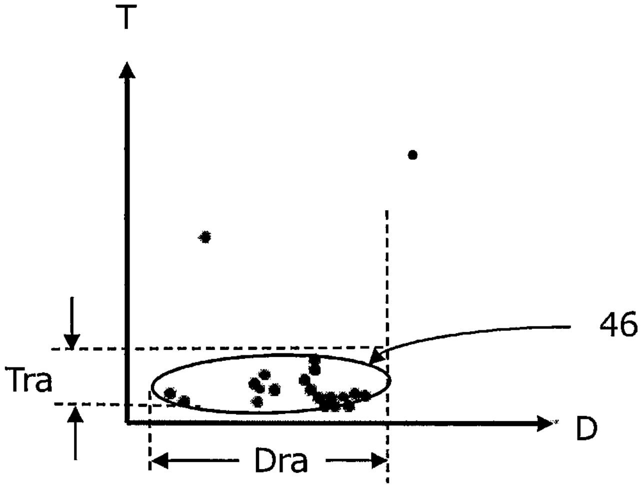
FIG. 13 is a diagram showing an example of a range that encloses the number of points that is equal to a predetermined percentage of the correct point group.

The range 44 including the correct point group may have not only rectangles but also various other shapes. For example, FIG. 13 shows an example of a range 46 that encloses 90% of the correct point group. The range 46 is, e.g., oval and defines permissible ranges Dra and Tra of the distance and time permitting connection, for the distance D and the time T, respectively. It would be understood that the range 44 shown in FIG. 12 has a relatively large area without points whereas the range 46 has a remarkably small area without points.

Below is another example of the range determination method. First, the center of gravity of the point group may be found so that an area within a predetermined distance around the center of gravity is determined as the permissible range. For example, Euclidean distance or Mahalanobis distance may be utilized to define the "predetermined distance" so that a closure including 90% of the correct point group therewithin is determined as that range.

2-2-2. Second Setting Technique of Trajectory Connection Parameter Information

Figure 14:
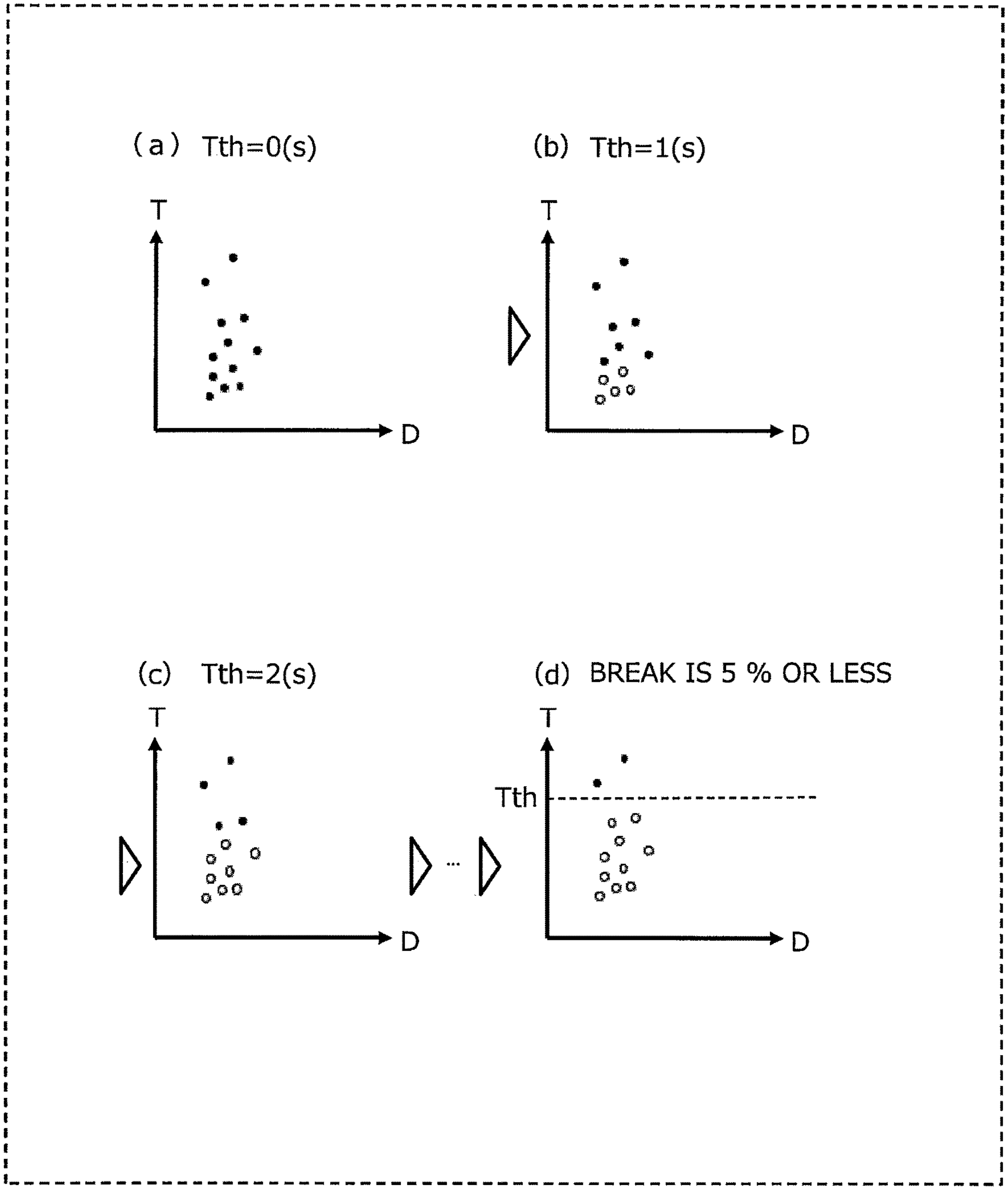
FIG. 14 is a diagram for explaining a technique of determining trajectory connection parameter information while changing connection conditions of two partial trajectories.

FIG. 14 is a diagram for explaining a technique of determining trajectory connection parameter information while changing the connection conditions of two partial trajectories. The axis of ordinates and the axis of abscissas are the same as those of FIGS. 12 and 13. Similar to FIGS. 12 and 13, black points depicted in graphs of (a) to (d) of FIG. 14 each show a relationship between the connection distance and the connection time between two partial trajectories in the case where the two partial trajectories are connected to each other. Note that the black points each represent a pair of partial trajectories that break off without being connected together since they do not satisfy the connection conditions. On the other hand, white points each represent a range of two partial trajectories connected together since they satisfy the connection conditions when changing the connection condition related to time.

(a) of FIG. 14 shows an example when the threshold value Tth of the connection condition related to time is 0 seconds. Since the time-related connection condition is not satisfied, there are no pairs of partial trajectories actually connected together. The white points are therefore absent. At this time, assume that the number of black points in presence is 100 for example.

(b) of FIG. 14 shows an example when the threshold value Tth of the connection condition related to time is 1 second. Some pairs satisfying the time-related connection condition appear and are depicted as white points. At this time, pairs not yet connected together are depicted as block points and the number of the black points is 50 for example.

(c) of FIG. 14 shows an example when the threshold value Tth of the connection condition related to time is 2 seconds. Pairs satisfying the time-related connection condition increase and the number of white points increases. Pairs not connected together remain black points, and number of the black points is 20 for example.

In this manner, the connection time is increased until the number of black points representing the number of times of break reaches a certain value or below, e.g., until it reaches 5% or below of the number at the connection time of 0 seconds (a), whereby the connection time achieving 5% or below can be set as the threshold value Tth ((d) of FIG. 14).

A similar method can be applied also to setting of the threshold value Dth related to distance.

2-2-3. Setting of Partial Areas

Description will then be given of a method of setting the entire area of the environment 200 by separating it into a plurality of partial areas.

As described earlier, the trajectory to be originally a single line breaks off due to various reasons and is divided into a plurality of partial trajectories. The tendency of occurrence of breaks in the trajectory differs for each of the partial areas due to the presence or absence of obstructions, difference in tendency of movement, etc. For example, in some partial areas, the worker may often hide behind other moving objects to cause frequent break, and in other partial areas, the worker may be easy to hide behind obstructions such as pillars. It is considered appropriate to determine the connection conditions for connecting the broken trajectory depending on such circumstances. In other words, if the same connection conditions are evenly set over the entire environment 200, they may be appropriate for some parts but may not be appropriate for other parts, with the result that proper connection conditions may not necessarily be ensured for the entire area of the environment 200.

Thus, the inventors separated the entire environment 200 into a plurality of partial areas to perform parameter setting suitable for each of the partial areas, to thereby improve the accuracy for connecting a plurality of partial trajectories as a single trajectory.

In order to separate the entire area of the environment 200 into a plurality of partial areas, a concept of "unit area" is first introduced. For example, the "unit area" may be one pixel on a video including part or all of the environment 200, or may be M pixels×N pixels (M, N: natural numbers). It can be said that a video taken of the environment 200 is composed of a plurality of unit areas. Moreover, it can be said that each of the plurality of partial areas to be set is a set of one or more unit areas. Hereinafter, the unit area is assumed as one pixel.

The tendency of occurrence of breaks in the trajectory differs for each of partial areas. The tendency may be determined based on the connection conditions related to time and/or distance for connecting the plurality of partial trajectories together. To that end, the controller 54 of the trajectory analysis device 50 extracts partial trajectories from a moving image data D0 acquired on trial for setting partial areas; sets the same connection conditions over the entire environment 200; and calculates, for each unit area, the number of broken partial trajectories, the number of times, the connection time between broken partial trajectories, the connection distance, the direction of movement and/or velocity.

For example, the number of broken partial trajectories means the number of times by which the trajectory broke off in the part in a unit area. Specifically, the controller 54 counts how many partial trajectories have ended within that unit area to calculate the number of broken partial trajectories. The method of counting the number of broken partial trajectories is an example, and the number of the partial trajectories may be counted by another method. Besides, the direction of movement may be an index indicative of the tendency of break since e.g., when an obstruction lies within a unit area, movement of a moving object toward the obstruction and movement not directed toward it are considered to differ from each other in how to enter blind spots of cameras.

In this description, these calculated values are referred to as "feature values". The calculated feature values represent features of each unit area calculated from the past partial trajectories. As the feature values, only one need not be selected from the number of broken partial trajectories, the number of times, the connection time between broken partial trajectories, the connection distance, the direction of movement, and velocity, described above, and plural ones may be selected therefrom.

In this embodiment, by applying an edge detection technique in image processing, the partial areas are set based on the feature values of each unit area obtained. The edge detection technique in image processing is a technique in which, with regard to grayscale value or RGB value for each pixel, i.e., pixel value, if the difference between pixel values of two adjacent pixels is equal to or greater than a predefined threshold value, the pixels are detected as an edge of an object within an image.

In this embodiment, the controller 54 figures out a feature value by the above procedure for each unit area, and if the amount of change between two adjacent feature value is equal to or greater than a predetermined threshold value, classifies the two adjacent unit areas as being in different partial areas. An example will hereinafter be described where only the number of times of break is used as the feature value of the unit area.

Figure 15:
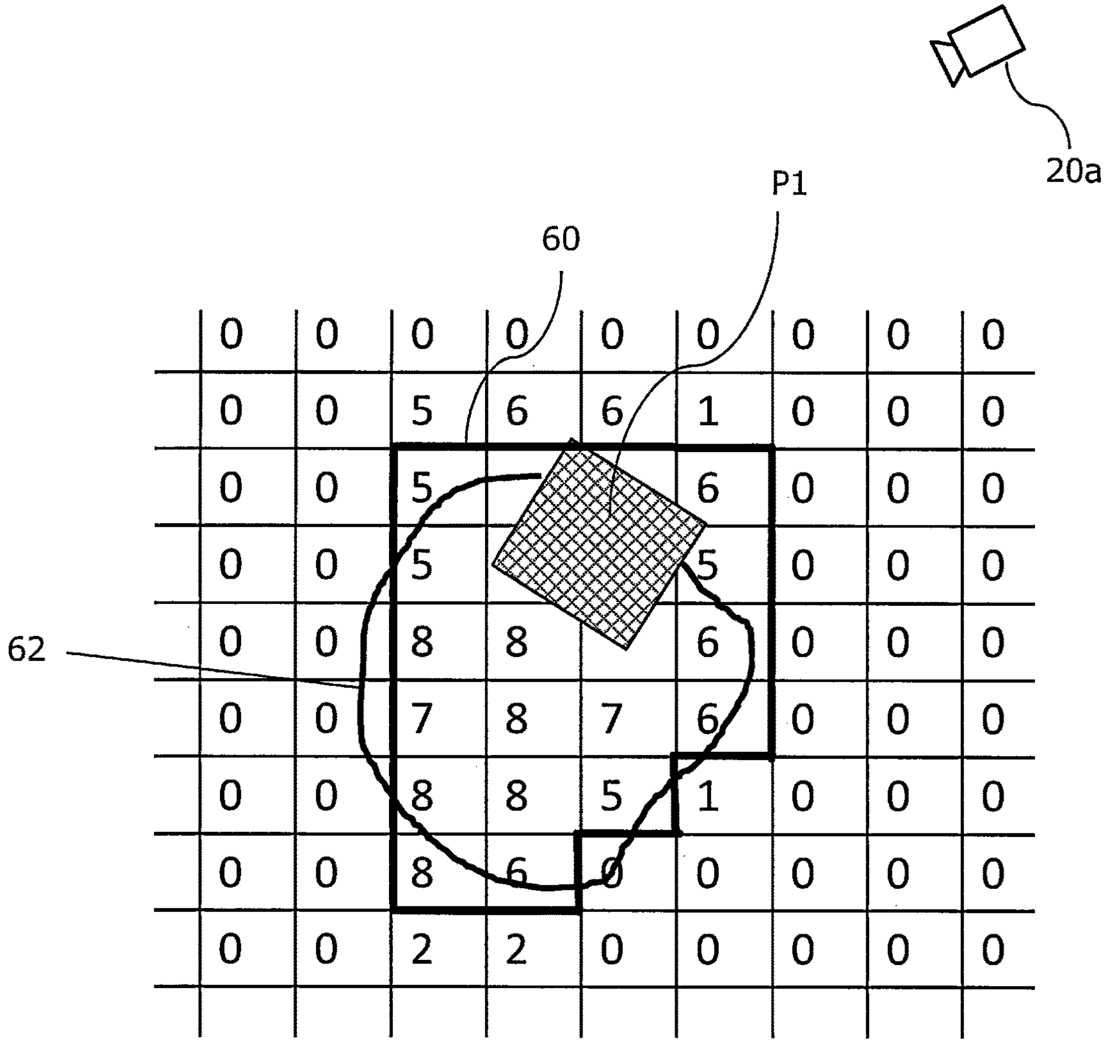
FIG. 15 is a diagram showing a partial area determined from feature values of unit areas by using the edge detection technique.

FIG. 15 shows a partial area 60 determined from feature values of unit areas by using the edge detection technique. Due to the blind spot of the camera 20*a* brought about by the obstruction P1 within the environment 200, the number of times of break increases and the feature value increases. As a result, the difference from adjacent pixel become large, allowing detection as an edge. A thick line defining the partial area 60 corresponds to the edge. Alternatively, the edge may be defined by a curved line 62 passing through unit areas in place of the straight line defining each unit area 60.

Figure 16:
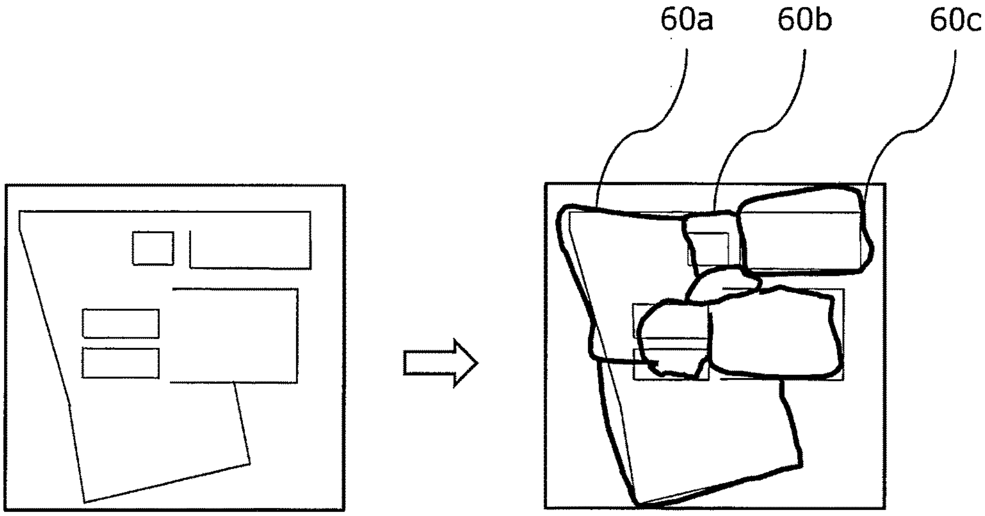
FIG. 16 is a diagram showing a plurality of partial areas that are set over an entire video of the environment.

FIG. 16 shows a plurality of partial areas 60*a*, 60*b*, 60*c*, etc. that are set over an entire video of the environment 200. The set partial areas 60*a*, 60*b*, 60*c*, etc. have feature values different from those of adjacent other partial areas. Since the feature values are related to the connection conditions, it becomes possible to connect a plurality of partial trajectories together as a single trajectory with high accuracy by individually setting connection conditions that depend on e.g., ease of break for each of partial areas.

Figure 17:
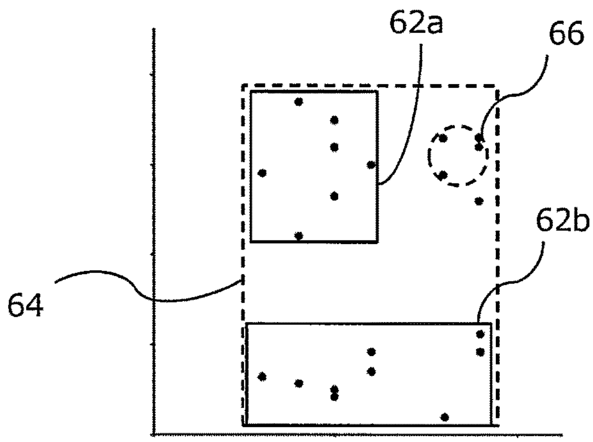
FIG. 17 is a diagram illustrating two ranges representative of connection conditions set for different partial areas, respectively, and a range representative of connection conditions in the case of being set over the entire environment without setting the partial areas.

FIG. 17 illustrates two ranges 62*a* and 62*b* representative of connection conditions set for different partial areas 60*a* and 60*b*, respectively, and a range 64 representative of connection conditions in the case of being set over the entire environment 200 without setting the partial areas. Once the range 64 is set, partial trajectory pairs included in e.g., a circular range 66 are also permitted to be connected together as a single trajectory, resulting in lowering of partial trajectory connection accuracy. On the other hand, the ranges 62*a* and 62*b* have connection conditions reflecting the feature values of the partial areas, and therefore do not permit the partial trajectory pairs included in the circular area 66 to be connected together as a single trajectory. This enables improvement in connection accuracy of a plurality of partial trajectories.

Figure 18:
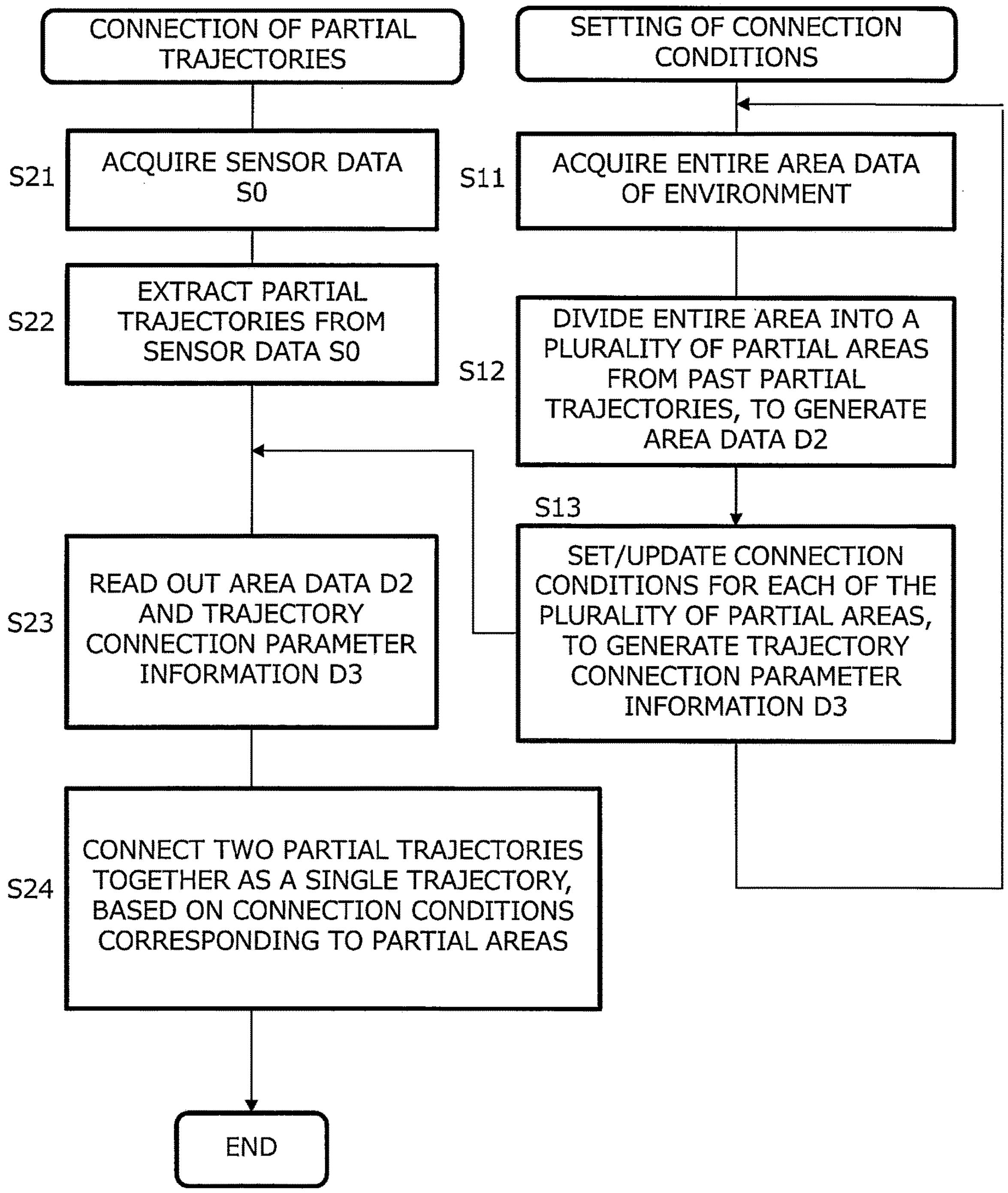
FIG. 18 is a flowchart showing a procedure of processes of dividing the entire area into a plurality of partial areas to set connection conditions, and a procedure of processes of applying the set connection conditions to each of the partial areas to connect a plurality of partial trajectories together as a single trajectory.

FIG. 18 is a flowchart showing a procedure of processes S11 to S13 of dividing the entire area into a plurality of partial areas to set connection conditions, and a procedure of processes S21 to S24 of applying the set connection conditions to each of the partial areas to connect a plurality of partial trajectories together as a single trajectory. This processing is executed by the controller 54 of the trajectory analysis device 50.

The controller 54 acquires entire area data of the environment (S11). The controller 54 divides the entire area into a plurality of partial areas from past partial trajectories, to generate area data D2 (S12). The controller 54 sets/updates connection conditions for each of the plurality of partial areas, to generate trajectory connection parameter information D3 (S13).

The controller 54 acquires sensor data S0 (S21). An example of the sensor data S0 is moving image data D0. The controller 54 extracts partial trajectories from the sensor data S0 (S22). The controller 54 reads out the area data D2 and the trajectory connection parameter information D3 generated at steps S12 and S13 (S23). The controller 54 connects two partial trajectories together as a single trajectory, based on connection conditions corresponding to the partial areas (S24).

Incidentally, in case that the blind spots of the cameras 20*a* and 20*b* have changed as a result of movement of a shelf within the environment 200, it is preferred to reset the plurality of partial areas for the environment 200 after the movement of the shelf. The reason is that the situation may change where the trajectory to be originally a single line is detected as partial trajectories. Hence, steps S11 to S13 may preferably be executed periodically or at timing when a predetermined change has occurred within the environment 200.

It is to be noted that steps S11 to S13 and steps S21 to S24 need not be executed at all times by a single trajectory analysis device 50. For example, another device may execute steps S11 to S13 to generate the area data D2 defining a plurality of partial areas and the trajectory connection parameter information D3 indicative of a connection condition applied to the partial areas. The controller 54 of the trajectory analysis device 50 receives the area data D2 and the trajectory connection parameter information D3 from another device, to perform the partial trajectory connection process.

According to the above processing, there can be provided a trajectory connection technique of connecting trajectory breaks, which may occur as a result of erroneous recognition of an object or due to the presence of an obstruction, to a correct trajectory, when performing an object trajectory extraction utilizing sensor devices such as cameras. The prior art needed to manually set parameters required for trajectory connection and necessitated analyzing break causes and trends, setting parameters with trial and error, etc. Particularly, considering the fact that the trajectory break trend differs depending on presence/absence of an obstruction and difference in movement trend of an object, manual setting was a very time-consuming task. Additionally, in case of evenly setting the connection conditions applied to the entirety, there was a problem that it was impossible to increase the accuracy of connecting a plurality of partial trajectories as a single trajectory.

According to the technique of the present disclosure, the accuracy of connecting a plurality of partial trajectories can be improved by subdividing the entire area into a plurality of partial areas depending on the individual trends and setting separate connection conditions for each of the partial areas, instead of using the same parameters for the entire environment from which a trajectory is extracted. The present disclosure enables connection conditions calculated from past partial trajectories to be automatically set for individual partial areas, achieving increase in the accuracy of connecting the partial trajectories together without any manual work.

The present disclosure is applicable to a trajectory analysis device and method for analyzing a trajectory of a moving object and connecting a plurality of partial trajectories appearing as a result of breaks of a single trajectory, into the single trajectory.

What is claimed is:

1. A trajectory analysis device extracting a trajectory of movement of a moving object by using results of detection by one or more sensors disposed in an environment where the moving object exists, comprising:

a storage configured to store: partial trajectory data indicative of a plurality of partial trajectories extracted in advance from the results of detection; connection parameter information indicative of a connection condition for connecting the partial trajectories to each other; and partial area data defining each of a plurality of partial areas; and a controller configured to connect two partial trajectories each belonging to any of the plurality of partial areas, based on the connection parameter information, to extract a trajectory of the moving object for each of the partial areas, the connection parameter information being set for each of the partial areas.

2. The trajectory analysis device according to claim 1, wherein the controller sets the connection parameter information of each of the partial areas, based on the partial trajectory data indicative of a plurality of partial trajectories, collected in past in the each of the partial areas.

3. The trajectory analysis device according to claim 2, wherein as a process of setting the connection parameter information of a predetermined partial area of the plurality of partial areas, the controller:

determines a pair of partial trajectories to be connected together while changing the connection condition, by using the past partial trajectory data collected in the predetermined partial area; and determines a connection condition satisfying a predetermined threshold value or a permissible range as the connection parameter information of the predetermined partial area.

4. The trajectory analysis device according to claim 3, wherein the connection condition is a maximum value of a physical distance between two partial trajectories or of a time difference related to a time of acquisition of each of the two partial trajectories, and wherein the controller determines two partial trajectories falling within a range of the connection condition as a pair of partial trajectories to be connected to each other.

5. The trajectory analysis device according to claim 4, wherein the controller determines, as the threshold value, magnitude of the physical distance and/or the time difference defined in advance.

6. The trajectory analysis device according to claim 4, wherein the controller determines, as the permissible range, a range of the physical distance and/or the time difference defined in advance.

7. The trajectory analysis device according to claim 5, wherein the physical distance is a length defined in the environment.

8. The trajectory analysis device according to claim 6, wherein the physical distance is a length defined in the environment.

9. The trajectory analysis device according to claim 7, wherein time information indicative of a time of acquisition is imparted to each of the partial trajectories, wherein the two partial trajectories include a first partial trajectory whose acquisition time is relatively early and a second partial trajectory whose acquisition time is relatively late, and wherein the length defined in the environment is a length along a straight line or a curved line joining an ending position of the first partial trajectory and a starting position of the second partial trajectory.

10. The trajectory analysis device according to claim 8, wherein time information indicative of a time of acquisition is imparted to each of the partial trajectories, wherein the two partial trajectories include a first partial trajectory whose acquisition time is relatively early and a second partial trajectory whose acquisition time is relatively late, and wherein the length defined in the environment is a length along a straight line or a curved line joining an ending position of the first partial trajectory and a starting position of the second partial trajectory.

11. The trajectory analysis device according to claim 5, wherein the one or more sensors are one or more imaging devices taking a video of the environment, and wherein the physical distance is a length defined on the video.

12. The trajectory analysis device according to claim 6, wherein the one or more sensors are one or more imaging devices taking a video of the environment, and wherein the physical distance is a length defined on the video.

13. The trajectory analysis device according to claim 5, wherein time information indicative of a time of acquisition is imparted to each of the partial trajectories, wherein the time difference is a difference between times of acquisition of the two partial trajectories.

14. The trajectory analysis device according to claim 1, wherein an area representative of the environment is composed of a plurality of unit areas, wherein each of the plurality of partial areas is a set of one or plural unit areas, and wherein the controller:

calculates a feature value of each unit area from the past partial trajectory data; and classifies two adjacent unit areas as lying in different partial areas if an amount of change between the feature values of the two adjacent unit areas is equal to or greater than a predetermined threshold value.

15. The trajectory analysis device according to claim 14, wherein the controller determines the feature value, based on one or more selected from a group consisting of: number of times of break of a trajectory in past within the unit area; magnitude of a physical or time distance for connecting broken partial trajectories together; and direction of movement of a moving object.

16. A trajectory analysis method using a trajectory analysis system, for extracting a trajectory of movement of a moving object from results of detection by one or more sensors disposed in an environment where the moving object exists, a trajectory analysis device of the trajectory analysis system comprising a controller and a storage, the storage storing: partial trajectory data indicative of a plurality of partial trajectories extracted in advance from the results of detection; connection parameter information indicative of a connection condition for connecting the partial trajectories to each other; and partial area data defining each of a plurality of partial areas, the controller executing:

reading out the partial trajectory data, the connection parameter information, and the partial area data, from the storage;

setting the connection parameter information for each of the partial areas; and connecting two partial trajectories each belonging to any of the plurality of partial areas, based on the connection parameter information, to extract a trajectory of the moving object for each of the partial areas.

17. A non-transitory computer-readable medium storing a computer program for causing the controller in the trajectory analysis device of the trajectory analysis system to execute the trajectory analysis method according to claim 16.

18. The trajectory analysis device according to claim 1, wherein the controller sets the connection parameter information for each of the partial areas based on a difference in a tendency of movement of the moving object in each of the partial areas.

19. The trajectory analysis device according to claim 1, wherein the controller sets the connection parameter information for each of the partial areas based on (i) a presence or an absence of obstructions or (ii) a tendency of breaks of the trajectory.

* * * * *